(12) United States Patent
Yukawa

(10) Patent No.: US 10,875,360 B2
(45) Date of Patent: Dec. 29, 2020

(54) PNEUMATIC TIRE

(71) Applicant: SUMITOMO RUBBER INDUSTRIES LTD., Kobe (JP)

(72) Inventor: Naoki Yukawa, Kobe (JP)

(73) Assignee: SUMITOMO RUBBER INDUSTRIES LTD., Kobe (JP)

(*) Notice: Subject to any disclaimer, the term of this patent is extended or adjusted under 35 U.S.C. 154(b) by 607 days.

(21) Appl. No.: 14/667,921

(22) Filed: Mar. 25, 2015

(65) Prior Publication Data
US 2015/0273944 A1 Oct. 1, 2015

(30) Foreign Application Priority Data

Mar. 25, 2014 (JP) ................. 2014-062420

(51) Int. Cl.
B60C 5/14 (2006.01)
B60C 9/18 (2006.01)
B60C 13/00 (2006.01)
B60C 15/00 (2006.01)
B60C 19/12 (2006.01)
B60C 9/02 (2006.01)
B29D 30/06 (2006.01)
(Continued)

(52) U.S. Cl.
CPC ............ B60C 5/14 (2013.01); B29D 30/0685 (2013.01); B60C 9/02 (2013.01); B60C 9/0292 (2013.01); B60C 9/18 (2013.01); B60C 13/00 (2013.01); B60C 15/00 (2013.01); B60C 19/002 (2013.01); B60C 19/122 (2013.01); B29D 2030/0694 (2013.01); B60C 2005/147 (2013.01); B60C 2009/283 (2013.01)

(58) Field of Classification Search
CPC ........... B60C 5/14; B60C 13/00; B60C 15/00; B60C 9/02; B60C 9/18; B60C 2005/147; B60C 19/002; B60C 9/0292; B60C 19/122; B60C 2009/283
USPC ......................................................... 152/510
See application file for complete search history.

(56) References Cited

U.S. PATENT DOCUMENTS 6,273,162 B1 * 8/2001 Ohara ................... B60C 1/0008
152/539
6,935,391 B2 * 8/2005 Naito ..................... B29C 73/166
152/154.1
(Continued)

FOREIGN PATENT DOCUMENTS

JP 2002-347418 A 12/2002

Primary Examiner — Seyed Masoud Malekzadeh
(74) Attorney, Agent, or Firm — Oblon, McClelland, Maier & Neustadt, L.L.P.

(57) ABSTRACT

A pneumatic tire includes a tread, side walls, beads, a carcass, a belt layer, an inner-liner layer, and a sealant layer. The inner-side surface of the inner-liner layer to which the sealant layer is adhered has profile that satisfies L1<L2<L3, L1≤5 mm, L2≤9.5 mm, and L3≤11 mm, where L1, L2 and L3 represent heights in a radial direction measured from a base height point to the inner-side surface of the inner-liner layer at positions located in an axially inward direction from an axial outer edge of the belt layer by 5%, 10% and 15% of a maximum width of the belt layer, and the base height point is a point on an axial-direction line through the intersection where a radial-direction line passing through the axial outer edge of the belt layer intersects the inner-side surface of the inner-liner layer.

19 Claims, 3 Drawing Sheets

(51) Int. Cl.
*B60C 19/00* (2006.01)
*B60C 9/28* (2006.01)

(56) References Cited

U.S. PATENT DOCUMENTS

| | | | |
|---|---|---|---|
| 8,646,501 B2* | 2/2014 | Ruegg, Jr. ......... | B29D 30/0685 152/502 |
| 2001/0050129 A1* | 12/2001 | Ohara .................. | B60C 1/0008 152/547 |
| 2003/0150544 A1* | 8/2003 | Naito ................... | B29C 73/166 156/115 |
| 2010/0307655 A1* | 12/2010 | Tanno .................. | B60C 19/002 152/504 |
| 2012/0118464 A1* | 5/2012 | Ruegg, Jr. ......... | B29D 30/0685 152/505 |

* cited by examiner

_US 10,875,360 B2_

PNEUMATIC TIRE

CROSS-REFERENCE TO RELATED APPLICATIONS

The present application is based upon and claims the benefit of priority to Japanese Patent Application No. 2014-062420, filed Mar. 25, 2014, the entire contents of which are incorporated herein by reference.

BACKGROUND OF THE INVENTION

Field of the Invention

The present invention relates to a pneumatic tire that exhibits excellent puncture-sealing capability.

Description of Background Art

Pneumatic tires with puncture-sealing capability have been proposed. In such a pneumatic tire, a viscous sealant is coated in advance on the cavity side of the tire tread section, for example. When a nail or the like punctures the tire and a hole is formed in the tread section, for example, the sealant deforms to fill the puncture, and air leakage from the puncture is thereby suppressed (see, for example, JP 2002-347418A). The entire contents of this publication are incorporated herein by reference.

SUMMARY OF THE INVENTION

According to one aspect of the present invention, a pneumatic tire includes a tread, a pair of side walls extending from axial edges of the tread in a radially inward direction, respectively, a pair of beads positioned on a radially inner side of the sidewalls and having a pair of bead cores, respectively, a carcass extending from the tread through the sidewalls to the bead cores of the beads, a belt layer positioned on a radially outer side of the carcass and on an inner side of the tread, an inner-liner layer including air-impermeable rubber and positioned on a radially inner side of the carcass, and a sealant layer adhered to a radially inner-side surface of the inner-liner layer in a tread section and having a tire width which is greater than a tire width of the belt layer in an axial direction. The inner-side surface of the inner-liner layer to which the sealant layer is adhered has a profile that satisfies L1<L2<L3, L1≤5 mm, L2≤9.5 mm, and L3≤11 mm, where L1, L2 and L3 represent heights in a radial direction measured from a base height point to the inner-side surface of the inner-liner layer at positions located in an axially inward direction from an axial outer edge of the belt layer by 5%, 10% and 15% of a maximum width of the belt layer in a meridian cross section including a rotation axis of a tire when the tire is mounted on a normal rim and is filled to have a normal inflation pressure with no load applied, and the base height point is a point on an axial-direction line that passes through the intersection where a radial-direction line passing through the axial outer edge of the belt layer intersects the inner-side surface of the inner-liner layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
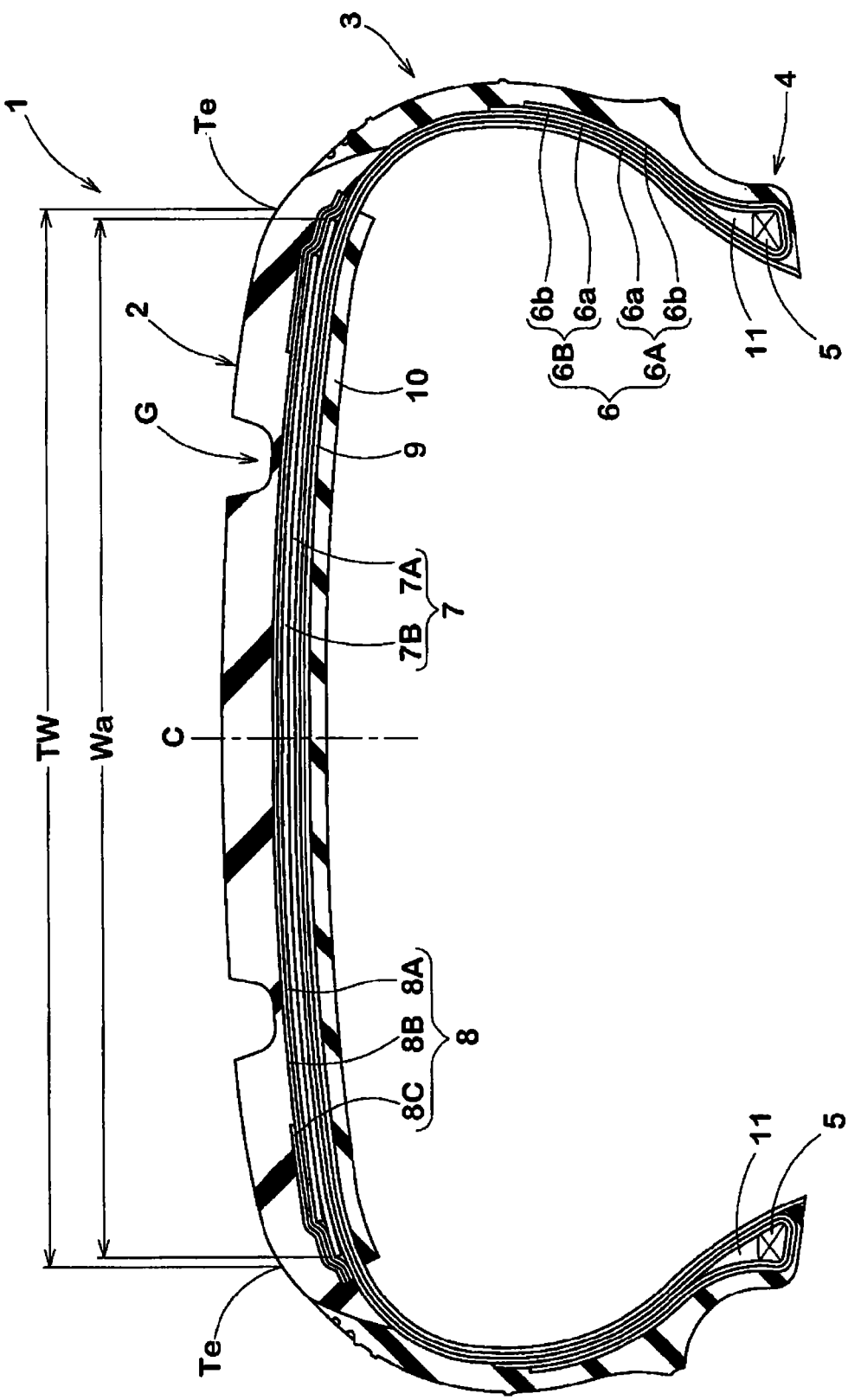
FIG. 1 is a tire meridian cross-sectional view showing a pneumatic tire according to an embodiment of the present invention.

The embodiments will now be described with reference to the accompanying drawings, wherein like reference numerals designate corresponding or identical elements throughout the various drawings.

In the following, an embodiment of the present invention is described with reference to the accompanying drawings.

FIG. 1 is a tire meridian cross-sectional view including the tire rotation axis, showing tire 1 of the present embodiment under normal conditions. As shown in FIG. 1, pneumatic tire 1 of the present embodiment (hereinafter may also be referred to as simply a tire) is preferably mounted on a passenger car, for example.

Normal conditions of a tire indicate that tire 1 is mounted on a normal rim (not shown), is filled with air to have a normal inflation pressure, and no load is applied thereon. In the present application, dimensions or the like in each section of tire 1 are those measured under normal conditions unless otherwise specified.

The normal rim above indicates a rim regulated by a regulatory system that includes standards for the tire: it is specified as a "Normal Rim" by JATMA; as a "Design Rim" by TRA; and as a "Measuring Rim" by ETRTO. Normal inflation pressure indicates air pressure regulated by a regulatory system that includes standards for the tire. For example, it is specified as "Maximum Air Pressure" by JATMA, maximum value described in a table "Tire Load Limits at Various Cold Inflation Pressures" by TRA, and "Inflation Pressure" by ETRTO. For a passenger tire, the inflation pressure is 180 kPa.

Tire 1 has tread section 2, a pair of sidewalls 3 each extending from a tire axial edge of the tread section in a tire radially inward direction, and bead section 4 each provided on the tire radially inner side of sidewall 3 and having bead core 5 embedded therein. Tread section 2 has grooves (G) for water drainage.

Tire 1 of the present embodiment further includes carcass 6, belt layer 7, band layer 8, inner-liner layer 9 and sealant layer 10.

Carcass 6 is formed with one or more carcass plies; in the present embodiment, there are carcass plies (6A, 6B) positioned on the tire radially inner and outer sides respectively. Carcass plies (6A, 6B) are each provided with main body (6a) and turn-up portion (6b). Main body (6a) extends from tread section 2 through sidewall 3 to reach bead core 5 of bead section 4. Turn-up portion (6b) is continued from main body (6a) and is turned up around bead core 5 from the tire axially inner side toward the outer side.

Carcass plies (6A, 6B) are each a cord ply obtained by covering carcass cords with a topping rubber. Carcass cords are arranged to incline at 70~90 degrees, for example, to tire equator (C). Carcass cords are preferred to be made of organic fibers selected from, for example, aramid, polyethylene naphthalate (PEN), nylon, rayon or the like.

Between main body (6a) and turn-up portion (6b) of carcass ply (6B), bead apex rubber 11 made of a hard rubber is positioned to extend from bead core 5 in the radially outward direction of the tire.

Belt layer 7 is made up of at least one layer of belt ply formed by arranging belt cords inclined at 5~45 degrees to tire equator (C); in the present embodiment, there are two belt plies (7A, 7B) positioned respectively on the radially inner and outer sides of the tire. Belt plies (7A, 7B) are laminated in such a direction that their cords intersect each other. Steel cords, for example, are preferred to be used as belt cords.

Inner and outer belt plies (7A, 7B) of the present embodiment are provided to extend substantially the entire region of tread section 2. In the present embodiment, inner belt ply (7A) has a greater width than outer belt ply (7B). A tire axially outer edge (7e) of inner belt ply (7A) is positioned near tread edge (Te). The maximum width (Wa) of belt layer 7 in a tire axial direction is preferred to be 95~105% of tread width (TW).

Under normal conditions with a normal load applied thereon, a "tread edge" (Te) of a tire is determined to be at a tire axially outermost position that makes contact with a planar surface at a camber angle of zero degrees. Under normal conditions, the distance between tread edges (Te, Te) in a tire axial direction is determined to be tread width (TW).

The normal load indicates what is regulated by a regulatory system that includes standards on which tires are based. For example, the normal load is specified as "Maximum Capacity Load" by JATMA, as "maximum value" in the table "Tire Load Limits at Various Cold Inflation Pressures" by TRA, and as "Load Capacity" by ETRTO. For a passenger car tire, the normal load corresponds to 88% of the load specified as above.

Band layer 8 is formed with at least one layer of band ply obtained by arranging band cords at an angle of 5 degrees or less with respect to a tire circumferential direction. In the present embodiment, the band ply includes full band plies (8A, 8B) positioned respectively on the inner and outer sides in a tire radial direction and covering substantially the entire width of belt layer 7, and also includes edge band ply (8C) that only covers each outer edge of belt layer 7 in a tire axial direction. Edge band ply (8C) is provided on the tire radially outer side of outer full band ply (8B). Full band plies (8A, 8B) and edge band ply (8C) each end on the axially outer side of belt layer 7.

Band cords are preferred to be made of organic fibers selected from, for example, nylon, rayon, aromatic polyamide, PEN or the like.

Inner-liner layer 9 is positioned on the tire radially inner side of inner carcass ply (6A). Inner-liner layer 9 of the present embodiment extends continuously between a pair of bead sections (4, 4). Inner-liner layer 9 is made of an air-impermeable rubber material, and prevents leakage of air filled in the tire cavity. Preferred examples of air-impermeable rubber are butyl rubber, halogenated butyl rubber and the like.

Figure 2:
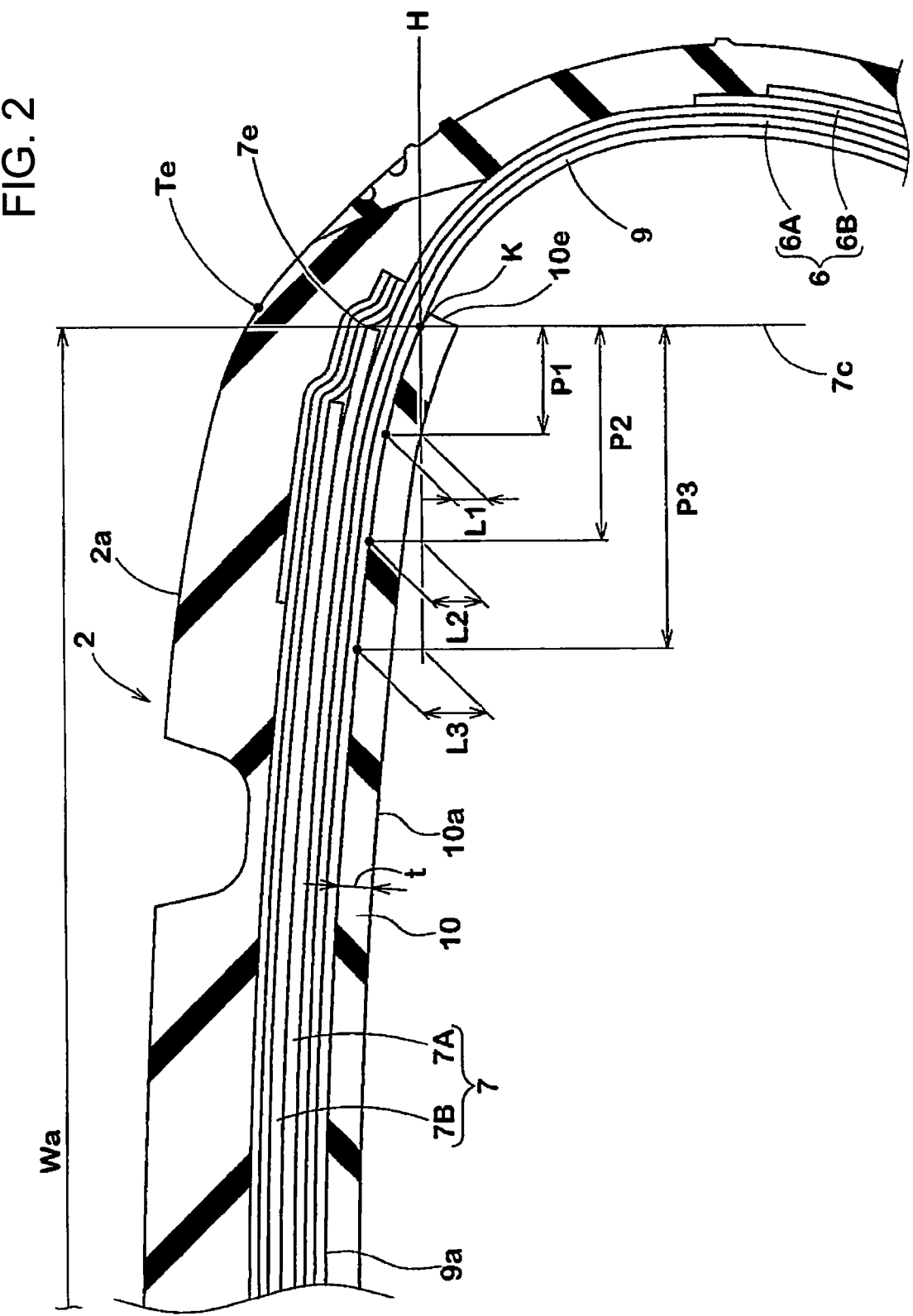
FIG. 2 is an enlarged view of the tire seen in FIG. 1, showing a portion that makes contact with the ground.

As shown in FIG. 2, sealant layer 10 is adhered to the tire radially inner-side surface (9a) of inner-liner layer 9 and extends to form a ring shape in a tire circumferential direction. Sealant layer 10 is made of a viscous rubber to fill a hole when the tire is punctured. Such sealant layer 10 suppresses leakage of air through deformation so as to fill a hole formed in tread section 2 when a nail or the like punctures the tire.

A preferred example of the rubber material for sealant layer 10 is a crosslinked product of a composition that contains butyl rubber, liquid rubber, inorganic additive, crosslinking agent, crosslinking aid or the like. When centrifugal force is generated during the tire run, such a sealant layer 10 is suppressed from flowing along the profile of inner-side surface (9a) of inner-liner layer 9.

Liquid rubber is preferred to contain polybutene. Polybutene is a viscous liquid polymer obtained through cationic polymerization of isobutane and normal butane, and exhibits excellent adhesiveness. The adhesiveness and viscosity of polybutene are less likely to deteriorate by the passage of time or by heat or pressure. Thus, polybutene seldom solidifies or dries up. As a result, by mixing polybutene in the rubber material of sealant layer 10, adhesiveness and sealant capability are further improved.

As for inorganic additives, they are preferred to contain at least one of carbon black, silica, calcium carbonate, calcium silicate, magnesium oxide, aluminum oxide, barium sulfate, talc and mica.

To enhance heat resistance, organic peroxide is preferred as a crosslinking agent.

Based on 100 parts by mass of butyl rubber, sealant layer 10 is preferred to contain 100~400 parts by mass of liquid rubber, 1~15 parts by mass of inorganic additive, 1~10 parts by mass of a crosslinking agent and 1~10 parts by mass of a crosslinking aid.

In the present embodiment, both outer edges (10e) of sealant layer 10 are positioned on the tire axially outer side of tire axially outer edge (7e) of belt layer 7. Accordingly, the above-described effects are achieved on the entire width of belt layer 7. More preferably, both outer edges (10e) of sealant layer 10 are positioned at 3~20 mm on the tire axially outer side of outer edge (7e) of belt layer 7 so as to suppress an increase in the mass of tire 1.

To suppress an increase in the mass of tire 1 while exhibiting excellent puncture-sealing capability, thickness (t1) of sealant layer 10 is preferred to be 1~10 mm, more preferably 1.5~5.0 mm.

In the present embodiment, the profile of inner-side surface (9a) of inner-liner layer 9 where sealant layer 10 is adhered satisfies the following formulas.

$$L1<L2<L3, L1\leq 5 \text{ mm}, L2\leq 9.5 \text{ mm}, L3\leq 11 \text{ mm}$$

Here, in a meridian cross section including the rotation axis of a tire under normal conditions, L1, L2 and L3 are heights in a tire radial direction measured from base height point (H) to the inner-side surface (9a) of inner-liner layer 9 at positions (P1)~(P3) which are located in an axially inward direction from tire axial outer edge (7e) of belt layer 7 by 5%, 10% and 15% respectively of the maximum width of the belt layer. Base height point (H) is on a tire axial-direction line that passes through intersection (K) where a tire radial-direction line (7c) passing through tire axial outer edge (7e) of belt layer 7 intersects with inner-side surface (9a) of inner-liner layer 9.

Centrifugal force generated during the tire run has a component which is parallel to inner-side surface (9a) of inner-liner layer 9 and which is in a tire axially inward direction. Thus, the profile of inner-side surface (9a) of inner-liner layer 9 where sealant layer 10 is adhered is specified so that the inclination of inner-side surface (9a) is smaller than that in a conventional tire and that the inclination is similar to a tire axial direction in a tire meridian cross section. As a result, the component above is reduced and sealant layer 10 is suppressed from flowing in an axially inward direction of the tire. Accordingly, pneumatic tire 1 of the present embodiment is capable of maintaining sealant layer 10 even on the tire axially outer side of belt layer 7, and thus exhibits excellent puncture-sealing capability.

In addition, because inner-side surface (9a) of inner-liner layer 9 is formed to have a relationship of L1<L2<L3, the profile of carcass 6 and outer surface (2a) of tread section 2, which is almost the same as that of inner-side surface (9a) of inner-liner layer 9, is also formed to be in an arc shape protruding slightly in a radially outward direction of the tire. Therefore, the pneumatic tire 1 according to an embodiment of the present invention is capable of preventing loss of steering control or the like on rough road surfaces.

In inner-side surface (9a) of inner-liner layer 9 of the present embodiment, the portion from base height position (H) to inner-side surface (9a) at point (P3) is smoothly extended. Accordingly, the profile is an arc shape protruding slightly toward a radially outward direction of the tire.

In a more preferred embodiment, inner-side surface (9a) of inner-liner layer 9 satisfies the following formulas.

$$L1 \geq 1 \text{ mm}, L2 \geq 1.5 \text{ mm}, L3 \geq 2 \text{ mm}$$

By so setting, the profile of carcass 6 and outer surface (2a) of tread section 2 is formed to have an arc shape protruding slightly in the radial outer direction of the tire, and thereby prevents loss of steering control or the like on rough road surfaces.

Figure 3:
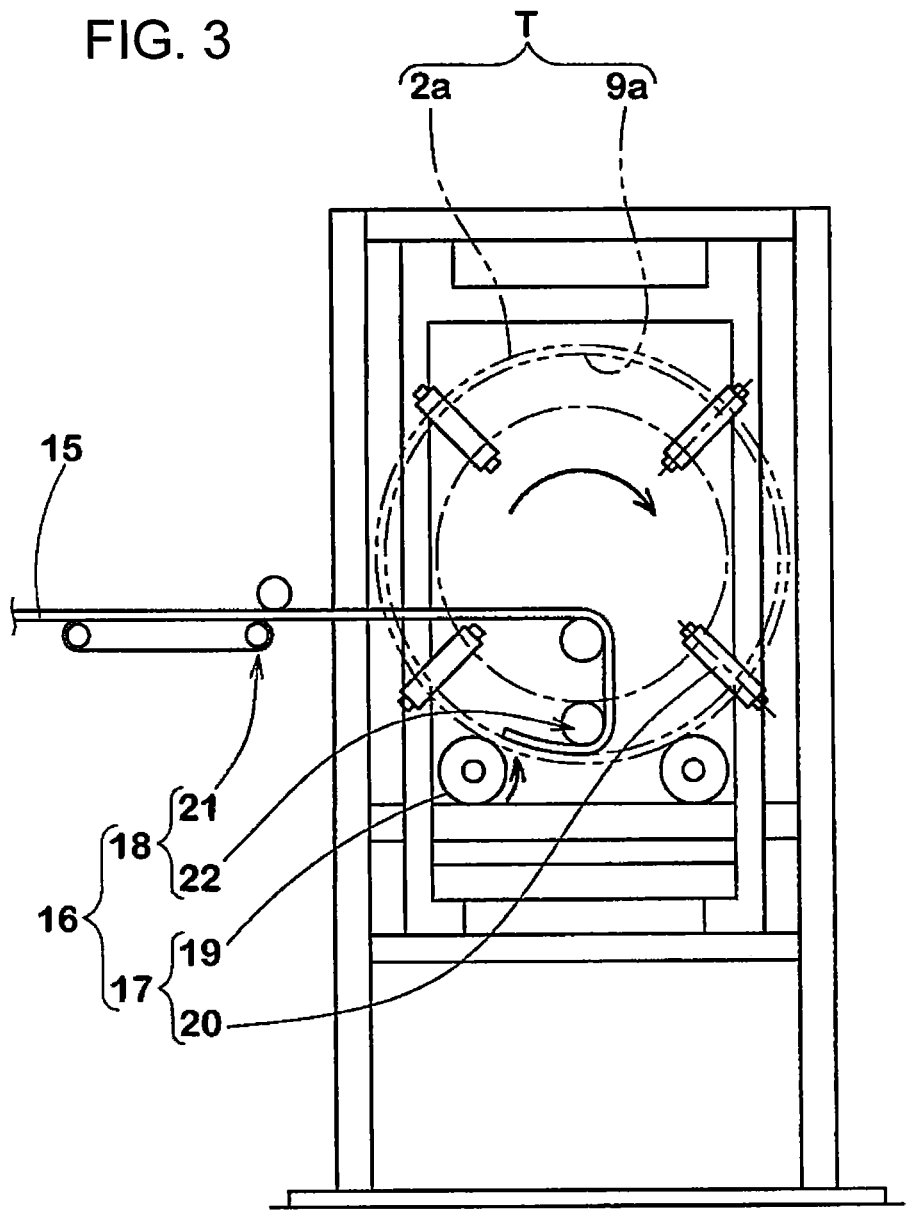
FIG. 3 is a side view schematically illustrating a machine for manufacturing a sealant layer.

Next, a method for manufacturing sealant layer 10 is described. FIG. 3 is a side view to provide a brief description of sealant-layer forming machine 16 to manufacture sealant layer 10. As shown in FIG. 3, sealant layer 10 of the present embodiment is manufactured by a so-called strip winding method for winding long rubber strip 15 on tire base body (T).

Rubber strip 15 is not crosslinked yet and has a rectangular cross section, for example, having a greater width relative to its thickness (not shown). The thickness and width of rubber strip 15 are determined to have conventional dimensions. In the present embodiment, the thickness of rubber strip 15 is preferred to be set at approximately 0.5~3 mm, and its width at approximately 1.5~10 mm.

Tire base body (T) is that of tire 1 shown in FIG. 1 but before sealant layer 10 is adhered. Thus, tire base body (T) has been vulcanized.

As shown in FIG. 3, sealant-layer forming machine 16 of the present embodiment has, for example, a holding jig 17 to hold tire base body (T), and applicator 18 to supply rubber strip 15 on inner-side surface (9a) of the inner-liner layer 9 of tire base body (T).

Holding jig 17 includes a pair of support rollers (19, 19) to support tire base body (T) in an upright position by making contact with outer surface (2a) of tread section 2 of tire base body (T), and multiple, four in the present embodiment, holding rollers 20 to support tire base body (T) in a rotatable position by extending over sidewalls on both sides. A power transmission device (not shown) is connected to one of support rollers 19 to rotate support rollers 19. Tire base body (T) rotates when support rollers 19 rotate.

Applicator 18 includes conveyor-type transfer device 21 to transfer rubber strip 15, and roller-type laminator device 22, for example, to laminate rubber strip 15 to inner-side surface (9a) of tire base body (T). Transfer device 21 and laminator device 22 are supported by, for example, a 3D moving device (not shown) capable of making a round trip in the axial and radial directions with respect to tire base body (T).

On the upstream side of applicator 18, a twin-screw continuous kneader, for example, is provided (not shown). Such a twin-screw continuous kneader continuously kneads the rubber materials for making sealant layer 10, and continuously extrudes rubber strip 15 from the discharge port to applicator 18.

To manufacture sealant layer 10, first, tire base body (T) is held in a rotatable position on sealant-layer forming machine 16. Next, a starting end of rubber strip 15, which is continuously supplied from applicator 18, is fixed to inner-side surface (9a) of tire base body (T). Then, while tire base body (T) is rotated, applicator 18 is moved in tire axial and radial directions so that rubber strip 15 is wound helically until reaching the terminal end of the strip (not shown).

A method for forming sealant layer 10 is not limited to the above. Sealant layer 10 may also be formed by the following method, for example: a nozzle is connected to the discharge port of a twin-screw continuous kneader, the nozzle is provided near the inner-side surface (9a) of tire base body (T), and rubber strip 15 is directly supplied from the twin-screw kneader to inner-side surface (9a) of tire base body (T) held to be rotatable by a holding jig 17 so that rubber strip 15 is laminated on the tire base body.

Next, sealant layer 10 made of rubber strip 15 is heated to crosslink the rubber. A method for applying heat is preferred to be, for example, putting tire base body (T) in an oven, applying hot air from a heated air blower, and irradiating infrared heat lamp rays on sealant layer 10, or the like.

In addition, to crosslink rubber strip 15, the heat of rubber strip 15 itself may also be used. Namely, the temperature of rubber strip 15 to be discharged from a twin-screw continuous kneader is maintained at 80~130° C. so that the rubber strip is gradually crosslinked after it is adhered to the tire base body.

To further accelerate crosslinking of rubber strip 15, it is also preferred to heat tire base body (T) to 40~70° C. at the time of the winding process of rubber strip 15.

So far, a pneumatic tire according to an embodiment of the present invention has been described in detail. However, the present invention is not limited to the embodiments above, and various modifications are possible. For example, to absorb and reduce resonance energy (vibration energy) generated in the cavity of tire 1, a foamed body (not shown) may be laminated on the tire radially inner side surface (10a) of sealant layer 10 (shown in FIG. 2) so as to suppress cavity resonance sounds. A preferred example of a formed body is an ether-based polyurethane sponge with a relative density of 0.005~0.06.

EXAMPLES

Pneumatic test tires in a size of 235/45R17 are each manufactured to have a basic structure shown in FIG. 1 and specifications shown in Table 1. The flow distance of the sealant layer and the degree of loss of steering control on rough road surfaces are checked in each test tire. The common specifications of each test tire and methods for testing are as follows. The composition for making sealant layers is shown in Table 2.
  outer edge (10e) of sealant layer: at the outer edge of belt layer+5 mm outward in a tire axial direction
  thickness (t) of sealant layer: 3 mm
  manufacturing method of sealant layer: lamination of rubber strip using a twin-screw continuous kneader
Flow Distance of Sealant Layer
  Each test tire was rotated on a high-speed drum test machine with a drum diameter of 1.7 m under the following conditions. Before and after the running test, outer edge positions of a sealant layer in tire axial directions were checked at eight spots on the tire circumference by using an X-ray CT scanning device. The results are shown as the average value of the differences before and after the running test. The smaller the value is, the better is the result.

rim: 17×8 J
inflation pressure: 220 kPa
load: 5 kN
speed: 120 km/h
running duration: 3 hours Steering Stability on Rough Road Test tires were mounted on all the wheels of a passenger car having a 2000 cc displacement under the conditions below. A test driver ran the car on a roughened dry asphalt road surface and conducted a sensory evaluation of steering stability (degree of steering wheel torque). The results are shown as indices based on the result obtained in Example 1 being set at 100. The greater the value is, the more excellent is the control.

rim: 17×8 J
inflation pressure: 220 kPa

The test results are shown in Table 1.

TABLE 1

|  | comp. example 1 | example 1 | example 2 | example 3 | example 4 | example 5 | comp. example 2 |
|---|---|---|---|---|---|---|---|
| height (L1) in tire radial direction (mm) | 6 | 5 | 4 | 2.5 | 1 | 0.5 | 0 |
| height (L2) in tire radial direction (mm) | 11 | 9.5 | 7.5 | 4.5 | 1.5 | 1 | 0 |
| height (L3) in tire radial direction (mm) | 13 | 11 | 9 | 6 | 2 | 1.5 | 0 |
| flow distance of sealant layer (mm) | 10 | 2.5 | 1 | 0 | 0 | 0 | 0 |
| steering stability [index, greater the better] | 100 | 100 | 100 | 100 | 98 | 95 | 85 |

TABLE 2

|  | parts by mass |
|---|---|
| butyl rubber | 100 |
| polybutene (HV-1900) | 200 |
| carbon black (N330) | 15 |
| oil (DOS) | 15 |
| crosslinking agent (QDO) | 7 |
| crosslinking aid (QO) | 7 |

As test results show above, it was confirmed that the tires of the examples exhibited a well-balanced improvement to the flow distance of a sealant layer and steering stability compared with tires of comparative examples. Thus, a tire according to an embodiment of the present invention exhibits excellent puncture-sealing capability while maintaining steering stability on rough road surfaces.

Although a sealant has a certain level of viscosity, the viscosity is lowered by the heat generated while a tire is running. In addition, due to the centrifugal force caused by the rotation of a tire, the sealant tends to flow toward the tire equatorial plane along the profile on the inner cavity surface of the tread section. Such movement of the sealant is likely to result in an insufficient amount of sealant on the edge sides of the tread section. Accordingly, if a puncture occurs near an edge, it is feared that the puncture may not be fully filled.

A pneumatic tire according to an embodiment of the present invention improves the profile of the inner side of the tread section where a sealant is adhered and provides excellent puncture-sealing capability.

A pneumatic tire according to one aspect of the present invention is formed with a carcass extending from the tread section through a sidewall to reach the bead core of each bead section; a belt layer positioned on the tire radially outer side of the carcass and on the inner side of the tread section; an inner-liner layer made of air-impermeable rubber and positioned on the tire radially inner side of the carcass; and a sealant layer adhered to the tire radially inner-side surface of the inner-liner layer in the tread section and having a greater width in a tire axial direction than that of the belt layer. In the tread section of such a pneumatic tire, the inner-side surface of the inner-liner layer where the sealant layer is adhered has a profile that satisfies the formulas below.

$L1 < L2 < L3$, $L1 \leq 5$ mm, $L2 \leq 9.5$ mm, $L3 \leq 11$ mm

In a meridian cross section including the rotation axis of a tire under normal conditions, that is, when the tire is mounted on a normal rim and is filled to have a normal inflation pressure with no load applied, L1, L2 and L3 are heights in a tire radial direction measured from the base height point to the inner-side surface of the inner-liner layer at positions located in a tire axially inward direction from a tire axial outer edge of the belt layer by 5%, 10% and 15% respectively of the maximum width of the belt layer. The base height point is on a tire axial-direction line that passes through the intersection where a tire radial-direction line passing through the tire axial direction outer edge of the belt layer intersects the inner-side surface of the inner-liner layer.

In a pneumatic tire according to an embodiment of the present invention, the profile of the inner-liner layer is preferred to satisfy the formulas below.

$L1 \geq 1$ mm, $L2 \geq 1.5$ mm, $L3 \geq 2$ mm

In a pneumatic tire according to an embodiment of the present invention, each of the outer edges of the sealant layer is preferred to be positioned on the outer side of the tire axial outer edge of the belt layer in a tire axial direction.

A pneumatic tire according to an embodiment of the present invention has a sealant layer on the radially inner-side surface of the inner-liner layer in the tread section.

The inner-side surface of the inner-liner layer where the sealant layer is adhered has a profile that satisfies the formulas below.

$L1 < L2 < L3$, $L1 < 5$ mm, $L2 \leq 9.5$ mm, $L3 \leq 11$ mm

Here, in a meridian cross section including the rotation axis of a tire under normal conditions, that is, when the tire is mounted on a normal rim and is filled to have a normal inflation pressure with no load applied, L1, L2 and L3 are heights in a tire radial direction measured from the base height point to the inner-side surface of the inner-liner layer at positions located in a tire axially inward direction from a tire axial outer edge of the belt layer by 5%, 10% and 15% respectively of the maximum width of the belt layer. The base height point is on a tire axial-direction line that passes through the intersection where a tire radial-direction line passing through the tire axial outer edge of the belt layer intersects the inner-side surface of the inner-liner layer.

By so specifying the profile of the inner-side surface of the inner-liner layer where the sealant layer is adhered, the inclination of the inner-side surface on a tire meridian cross section is smaller than that of a conventional tire, and is similar to a tire axial direction. When centrifugal force is generated during the tire run, such a profile reduces a component of the force that is parallel to the inner-side surface of the inner-liner layer and in a tire axially inward direction. Accordingly, the sealant layer is suppressed from flowing in an axially inward direction of the tire. As a result, a pneumatic tire according to an embodiment of the present invention is capable of sufficiently maintaining the sealant layer on the tire axially outer side of the belt layer, and thereby exhibits excellent puncture-sealing capability.

In addition, because the inner-side surface is formed to have a relationship of $L1<L2<L3$, the outer-side profile of the carcass and tread section, which is almost the same as the inner-side profile of the inner-liner layer, is also formed in an arc shape protruding slightly in a radially outward direction of the tire. Therefore, a pneumatic tire according to an embodiment of the present invention is capable of preventing loss of steering control on rough road surfaces.

Obviously, numerous modifications and variations of the present invention are possible in light of the above teachings. It is therefore to be understood that within the scope of the appended claims, the invention may be practiced otherwise than as specifically described herein.

What is claimed is:

1. A pneumatic tire, comprising:
    a tread;
    a pair of sidewalls extending from axial edges of the tread in a radially inward direction, respectively;
    a pair of beads positioned on a radially inner side of the sidewalls and having a pair of bead cores, respectively;
    a carcass extending from the tread through the sidewalls to the bead cores of the beads;
    a belt layer positioned on a radially outer side of the carcass and on an inner side of the tread;
    an inner-liner layer comprising air-impermeable rubber and positioned on a radially inner side of the carcass; and
    a sealant layer adhered to a radially inner-side surface of the inner-liner layer in a tread section and having a tire width which is greater than a tire width of the belt layer in an axial direction,
    wherein the inner-side surface of the inner-liner layer to which the sealant layer is adhered has a profile that satisfies $L1<L2<L3$, $L1 \leq 5$ mm, $L2 \leq 9.5$ mm, and $L3 \leq 11$ mm, where L1, L2 and L3 represent heights in a radial direction measured from a base height point to the inner-side surface of the inner-liner layer at positions located in an axially inward direction from an axial outer edge of the belt layer by 5%, 10% and 15% of a maximum width of the belt layer in a meridian cross section including a rotation axis of a tire when the tire is mounted on a normal rim and is filled to have a normal inflation pressure with no load applied, and
    wherein the base height point is a point on an axial-direction line that passes through an intersection where a radial-direction line, starting passing through in between the axial edges of the tread heading towards the sealant layer, intersects the inner-side surface of the inner-liner layer,
    wherein the radial-direction line passes through the axial outer edge of the belt layer, through in between the axial edges of the tread, and through the sealant layer.
2. The pneumatic tire according to claim 1, wherein a profile of the inner-liner layer satisfies $L1 \geq 1$ mm, $L2 \geq 1.5$ mm, and $L3 \geq 2$ mm.
3. The pneumatic tire according to claim 1, wherein each of outer edges of the sealant layer is positioned on an outer side of the axial outer edge of the belt layer in the axial direction.
4. The pneumatic tire according to claim 2, wherein each of outer edges of the sealant layer is positioned on an outer side of the axial outer edge of the belt layer in the axial direction.
5. The pneumatic tire according to claim 1, wherein a profile of the inner-liner layer satisfies $L1 \leq 4$ mm, $L2 \leq 7.5$ mm, and $L3 \leq 9$ mm.
6. The pneumatic tire according to claim 1, wherein a profile of the inner-liner layer satisfies $L1 \leq 2.5$ mm, $L2 \leq 4.5$ mm, and $L3 \leq 6$ mm.
7. The pneumatic tire according to claim 1, wherein a profile of the inner-liner layer satisfies $L1 \leq 1$ mm, $L2 \leq 1.5$ mm, and $L3 \leq 2$ mm.
8. The pneumatic tire according to claim 1, wherein a profile of the inner-liner layer satisfies $L1 \leq 0.5$ mm, $L2 \leq 1$ mm, and $L3 \leq 1.5$ mm.
9. The pneumatic tire according to claim 1, wherein a profile of the inner-liner layer satisfies $L1 \geq 0.5$ mm, $L2 \geq 1$ mm, and $L3 \geq 1.5$ mm.
10. The pneumatic tire according to claim 1, wherein a profile of the inner-liner layer satisfies $L1 \geq 1$ mm, $L2 \geq 1.5$ mm, and $L3 \geq 2.0$ mm.
11. The pneumatic tire according to claim 1, wherein a profile of the inner-liner layer satisfies $L1 \geq 2.5$ mm, $L2 \geq 4.5$ mm, and $L3 \geq 6$ mm.
12. The pneumatic tire according to claim 1, wherein a flow distance of the sealant layer is 2.5 mm or less.
13. The pneumatic tire according to claim 12, wherein the flow distance of the sealant layer is 1 mm or less.
14. The pneumatic tire according to claim 1, further comprising: a foamed body laminated on a radially inner-side surface of the sealant layer to suppress cavity resonance sounds.
15. The pneumatic tire according to claim 14, wherein the foamed body is an ether-based polyurethane sponge.
16. The pneumatic tire according to claim 15, wherein a relative density of the ether-based polyurethane sponge is between 0.005 and 0.06.
17. The pneumatic tire according to claim 1, wherein a thickness of the sealant layer is between 1 and 10 mm.
18. The pneumatic tire according to claim 17, wherein the thickness of the sealant layer is between 1.5 and 5.0 mm.
19. The pneumatic tire according to claim 3, wherein each of the outer edges of sealant layer is positioned at between 3 and 20 mm on the outer side of the axial outer edge of the belt layer.

* * * * *